United States Patent
Rathod et al.

(10) Patent No.: US 11,618,516 B2
(45) Date of Patent: Apr. 4, 2023

(54) HIGH CARBON STEEL TRACK BUSHING

(71) Applicant: Caterpillar Inc., Peoria, IL (US)

(72) Inventors: Chandrasen Rameshlal Rathod, Peoria, IL (US); Roger Lee Recker, Dunlap, IL (US); Robert Jason Pickerill, Peoria, IL (US); Scott E. Keele, Germantown Hills, IL (US); Matthew Thomas Kiser, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 167 days.

(21) Appl. No.: 16/584,158

(22) Filed: Sep. 26, 2019

(65) Prior Publication Data

US 2021/0095355 A1    Apr. 1, 2021

(51) Int. Cl.
| | |
|---|---|
| *B62D 55/15* | (2006.01) |
| *B62D 55/21* | (2006.01) |
| *F16G 15/00* | (2006.01) |
| *C21D 9/00* | (2006.01) |

(52) U.S. Cl.
CPC ............ *B62D 55/15* (2013.01); *B62D 55/21* (2013.01); *C21D 9/0087* (2013.01); *F16G 15/00* (2013.01); *C21D 2211/003* (2013.01)

(58) Field of Classification Search
CPC ...... C21D 9/0068; C21D 9/0087; C21D 9/08; C21D 9/085; C21D 2211/003; C21D 2211/008; C21D 1/10; C21D 1/14; C21D 1/18; C21D 1/19; C21D 1/42; B62D 55/15; B62D 55/18; B62D 55/20; B62D 55/205;

(Continued)

(56) References Cited

U.S. PATENT DOCUMENTS

| | | | | |
|---|---|---|---|---|
| 3,227,586 A | * | 1/1966 | Spencer | B62D 55/0887 148/319 |
| 3,567,529 A | * | 3/1971 | Burtnett | C21D 9/08 148/571 |
| 4,842,424 A | | 6/1989 | Narkon et al. | |

(Continued)

FOREIGN PATENT DOCUMENTS

| | | |
|---|---|---|
| JP | S58-189327 A | 11/1983 |
| JP | 2009007677 A | 1/2009 |

OTHER PUBLICATIONS

Gordon England, Hardness Conversion Table (Year: 2020).*

*Primary Examiner* — Anthony J Zimmer
*Assistant Examiner* — Dean Mazzola
(74) *Attorney, Agent, or Firm* — Lee & Hayes, PLLC (57) ABSTRACT

An example bushing has three portions along its radial direction including an inner portion most proximal to a central hole of the bushing, an outer portion most distal from the center hole, and a core portion between the inner portion and the outer portion. The core portion has a hardness that is less than the hardness of the inner portion or the outer portion of the bushing. The bushing may be formed using high carbon steel, which in some cases may be spheroidal cementite crystal structure. A rough bushing may be formed using the high carbon steel, followed by a direct hardening process, and an induction hardening process on the inner surface most proximal to the central hole of the bushing. The induction hardening on the inner surface may harden the outer portion while tempering the core portion of the bushing.

20 Claims, 6 Drawing Sheets

(58) Field of Classification Search
CPC ......... B62D 55/21; F16G 15/00; F16G 15/02;
F16G 15/04; F16G 15/12; F16G 15/14
See application file for complete search history.

(56) References Cited

U.S. PATENT DOCUMENTS

| | | | | |
|---|---|---|---|---|
| 5,032,192 | A | * | 7/1991 | Tsuchiya .................. C21D 9/14 |
| | | | | 148/224 |
| 5,249,868 | A | * | 10/1993 | Watts .................. B62D 55/205 |
| | | | | 148/570 |
| 5,264,053 | A | * | 11/1993 | Nakajima ................ C21D 9/14 |
| | | | | 148/570 |
| 6,270,595 | B1 | | 8/2001 | Takayama et al. |
| 6,402,862 | B1 | | 6/2002 | Anderton et al. |
| 6,948,784 | B2 | | 9/2005 | Wodrich et al. |
| 7,345,255 | B2 | | 3/2008 | Jiang et al. |
| 9,616,951 | B2 | | 4/2017 | Wodrich |
| 9,790,578 | B2 | | 10/2017 | Eiji et al. |
| 2001/0050121 | A1 | * | 12/2001 | Takayama ................ C21D 9/14 |
| | | | | 148/570 |

\* cited by examiner

HIGH CARBON STEEL TRACK BUSHING

TECHNICAL FIELD

The present disclosure relates to high carbon steel track bushings. More specifically, the present disclosure relates to track bushings made of high carbon steel that are hardened to achieve improved wear life.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments where creating sufficient traction is problematic, such as those frequently found in the industries identified above. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, drive sprockets, idlers, tensioners, and rollers, for example.

Typical track chain assembly designs include a track pin either fixedly or rotatably connected to a pair of chain links and a bushing rotatably positioned between the links and about the track pin. Such track chain assemblies can operate in extremely adverse environments in which track joints may be exposed to various abrasive mixtures of water, dirt, sand, rock or other mineral or chemical elements. The bearing interface between the track pin and the bushing can encounter high contact stresses which lead to galling failure. Galling is a principal failure mode for track chain assemblies and can limit the life of track chain assemblies in many applications. Additionally, operation of track chain assemblies can wear out the components of the track chain, such as the bushings.

During operation, the track bushing may experience excessive loading. Different surfaces of the track bushing, for example, an inner diameter, end ring surfaces, and so on may require abrasion resistance with increased strength and toughness to endure loads that may be imposed on the track bushing. The track bushing is generally made of low or medium carbon steel. Additionally, the track bushing may be tempered to produce the track bushing of desired hardness. However, the production of the track bushing may be a time consuming, laborious, and costly process. Furthermore, the final bushing may fail to provide sufficient wear resistance and toughness when produced by traditional methods.

An example of producing bushings is described in U.S. Pat. No. 9,616,951 (hereinafter referred to as the '951 reference), where a hard metal alloy slurry disposed on a surface or into an undercut or channel and then fused to form a metallurgical bond with the iron-based alloy. However, this requires additional processing steps, such as undercutting and application of metal alloy slurry. Additionally, in this process of slurry application and fusing, as described in the '951 reference, may limit the thickness of the hard outer layer, such as to about 1 mm to 2 mm.

Example embodiments of the present disclosure are directed toward overcoming the deficiencies described above.

SUMMARY

In an example embodiment of the present disclosure, a method for manufacturing a bushing includes performing a direct hardening of a rough bushing. The rough bushing is formed from high carbon steel with a carbon content greater than 0.8% by weight. Furthermore, the high carbon steel includes cementite crystal structure. The method further includes performing an induction hardening on an inner surface of the rough bushing to form a hardened inner portion of the bushing and a soft core portion of the bushing.

In another example embodiment of the present disclosure, a bushing includes an outer surface and an inner surface opposing the outer surface, the inner surface defining a channel having a substantially constant diameter, the channel extending substantially centrally through the bushing from a first end of the bushing to a second end of the bushing opposite the first end. The bushing further has an inner portion including the inner surface, an outer portion including the outer surface, and a core portion disposed between the inner portion and the outer portion. In this bushing, the core portion is softer than the inner portion and the core portion is softer than the outer portion.

In yet another example embodiment of the present disclosure, a track chain assembly comprising a plurality of components including a plurality of track shoes, a plurality of links, and a plurality of bushings. At least one bushing includes an inner portion, an outer portion, and a core portion between the inner portion and the outer portion. The core portion is softer than the inner portion and the core portion is softer than the outer portion. Furthermore, the outer portion is at least 5 mm in thickness and has a hardness greater than 55 HRC and the core portion has a hardness less than 52 HRC.

DETAILED DESCRIPTION

Wherever possible, the same reference numbers will be used throughout the drawings to refer to the same or like parts.

Figure 1:
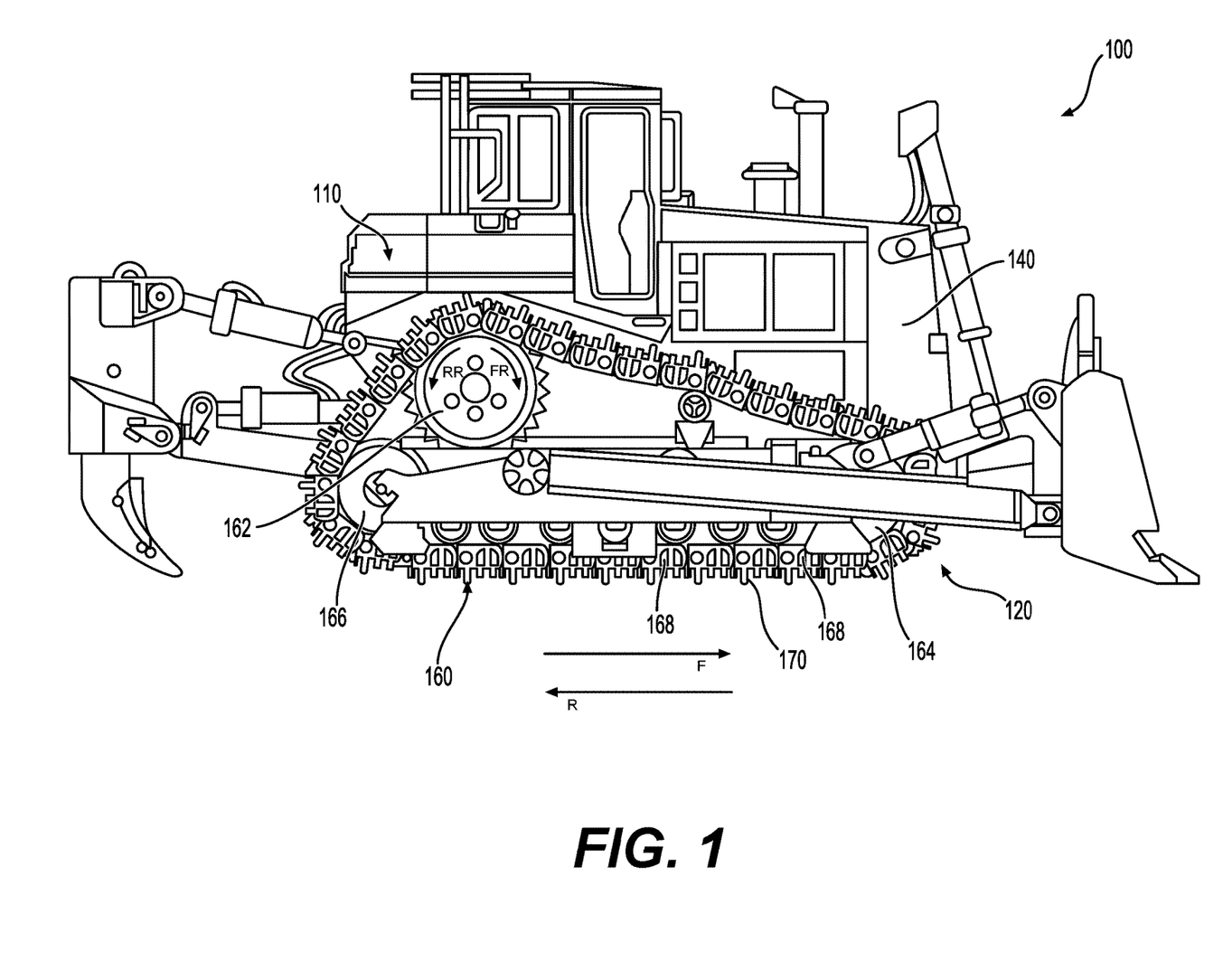
FIG. 1 is a schematic illustration of an example system including a track-type machine with one or more components formed in accordance with example embodiments of the disclosure.

FIG. 1 is a schematic illustration of an example system including a track-type machine 100 with one or more components formed in accordance with example embodiments of the disclosure. The example embodiment of the machine 100 includes a track-type undercarriage 120. The machine 100 may also be referenced herein interchangeably as a track-type machine 100 and/or machine 100. In other embodiments, the machine 100 may be any suitable machine with a track-type undercarriage 120, such as, a dozer, loader, excavator, tank, backhoe, drilling machine, trencher, or any other on-highway or off-highway vehicle.

The machine 100 includes a frame 140 having a first track chain assembly 160 disposed on a first side 110 thereof, and a second track chain assembly (not shown) disposed on a second side (not shown) thereof. The second side is in opposing relationship to the first side 110. Together, the track assemblies are adapted to engage the ground, or other surface, to propel the machine 100 in a backward and/or forward direction.

It should be appreciated that the track assemblies of the machine 100 may be similar and, further, may represent mirror images of one another. As such, only the first track chain assembly 160 will be described herein. It should be understood that the description of the first track chain assembly 160 may be applicable to the second track chain assembly, as well. Other embodiments, in accordance with the disclosure, may include more than two track chain assemblies. Thus, the apparatus, systems, and methods, as disclosed herein, apply to any suitable track-type machine, or variations thereof. Additionally, the disclosed components of the track-type machine 100 and the mechanism of formation thereof, as discussed herein, may also apply to other systems, such as non-track type machines and/or other mechanical systems.

With continuing reference to FIG. 1, the first track chain assembly 160 extends about a plurality of rolling elements such as a drive sprocket 162, a front idler 164, a rear idler 166, and a plurality of track rollers 168. The track chain assembly 160 includes a plurality of ground-engaging track shoes 170 for engaging the ground, or other surface, and propelling the machine 100.

During typical operation of the undercarriage 120, the drive sprocket 162 is driven, such as by an engine, in a forward rotational direction FR to drive the track chain assembly 160, and thus the machine 100, in a forward direction F, and in a reverse rotational direction RR to drive the track chain assembly 160, and thus the machine 100, in a reverse direction R. The drive sprockets 162 of the undercarriage 120 can be independently operated to turn the machine 100.

The undercarriage 120 and track chain assembly 160 may include a variety of other components, as described herein. Due to the harsh operating environments and the loads put on various components of the track chain assembly, it is desirable to improve material properties of the various components of the track chain assembly to improve the usable life of those components.

While the machine 100 is illustrated in the context of a track-type machine, it should be appreciated that the present disclosure is not thereby limited, and that a wide variety of other machines having tracks are also contemplated within the present context. For example, in other embodiments, the track chain assembly 160 can be included in a conveyor system, as a track for transmitting torque between rotating elements, or in any other application known to those skilled in the art. Additionally, machines without tracks may include components, as disclosed herein.

According to example embodiments of the disclosure, various components of the machine 100 and its track chain assembly 160 may be formed in manner that improves their wear resistance, while maintaining and/or improving their overall toughness. The mechanisms as disclosed herein may apply to any variety of the track chain assembly components disclosed herein, to increase the surface hardness of those components, while maintaining a softer core portion in those components to provide improved surface wear resistance, reduced galling between parts, and high toughness.

Figure 2:
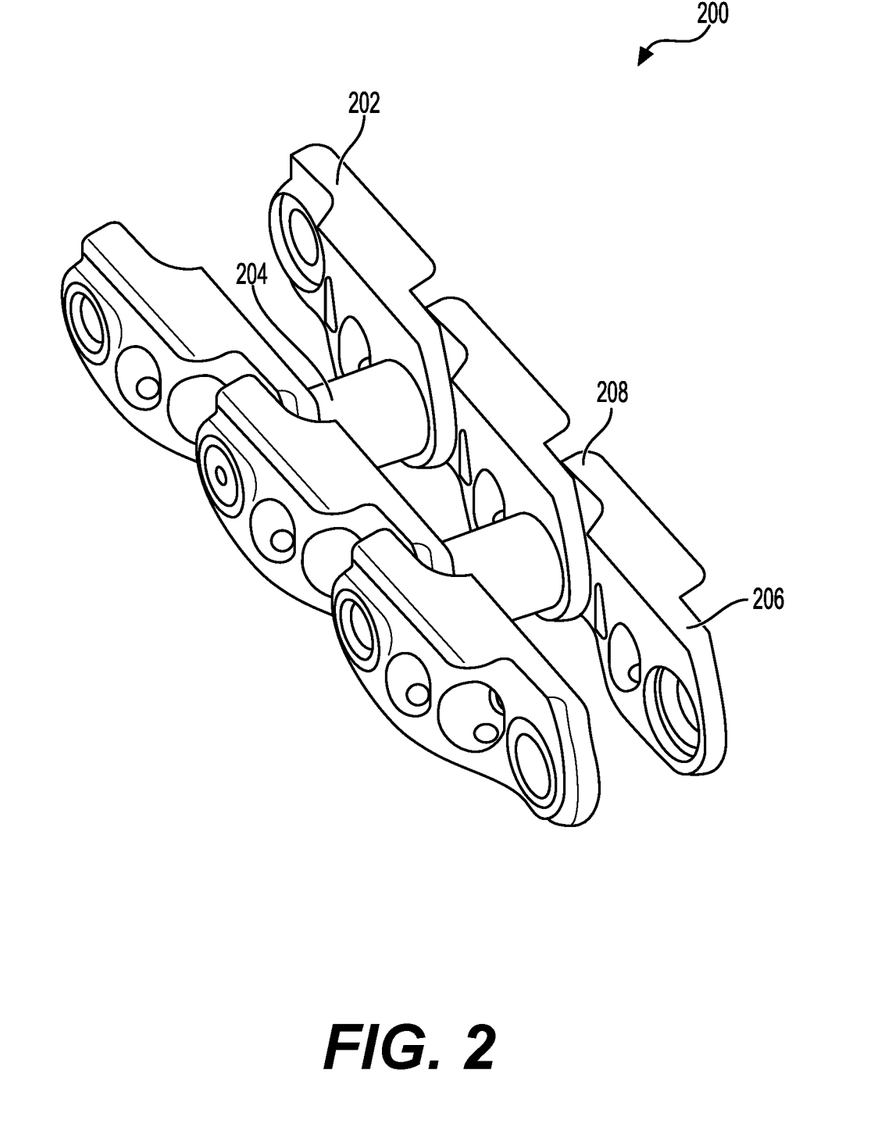
FIG. 2 is a schematic illustration of an example portion of a track chain assembly for an undercarriage of an example track-type machine as depicted in FIG. 1, according to example embodiments of the disclosure.

FIG. 2 is a schematic illustration of an example portion 200 of a track chain assembly 160 for an undercarriage of an example track-type machine 100 as depicted in FIG. 1, according to example embodiments of the disclosure. As discussed above, when operated, a drive sprocket 162 of the track-type machine 100 may rotate the track assembly 160 about one or more idlers or other guiding components, such as the front idler 164, a rear idler 166, and a plurality of track rollers 168, to facilitate movement of the machine 100.

The track assembly 160 may further include a series of links 202 that may be joined to each other by laterally disposed track bushings 204. As shown, the links 202 may be offset links. That is, each of the links 202 may have an inwardly offset end 206 and an outwardly offset end 208. The inwardly offset end 206 of each of the links 202 are joined to the respective outwardly offset end 208 of each of the adjacent links. In addition, the inwardly offset end 206 of each of the links 202 may be joined to the inwardly offset end 206 of the opposing link, and the outwardly offset end 208 of each of the links 202 may be joined to the outwardly offset end 208 of the opposing link by the track bushing 204. It should be understood, however, that links 202 need not be offset links. Rather, in some embodiments, the links 202 may include inner links and outer links. In such embodiments, both ends of each opposing pair of inner links are positioned between ends of opposing outer links, as is known in the art.

In some aspects, at least part of the present disclosure relates to the formation, production, and/or manufacture of the track bushing 204 and the components and systems in which the track bushing is used, such as the track chain assembly 160 and/or machine 100. Additionally, the mechanisms for formation of the track bushing 204 may be applied to other components, such as other components of the track chain assembly 160 and/or machine 100.

Figure 3:
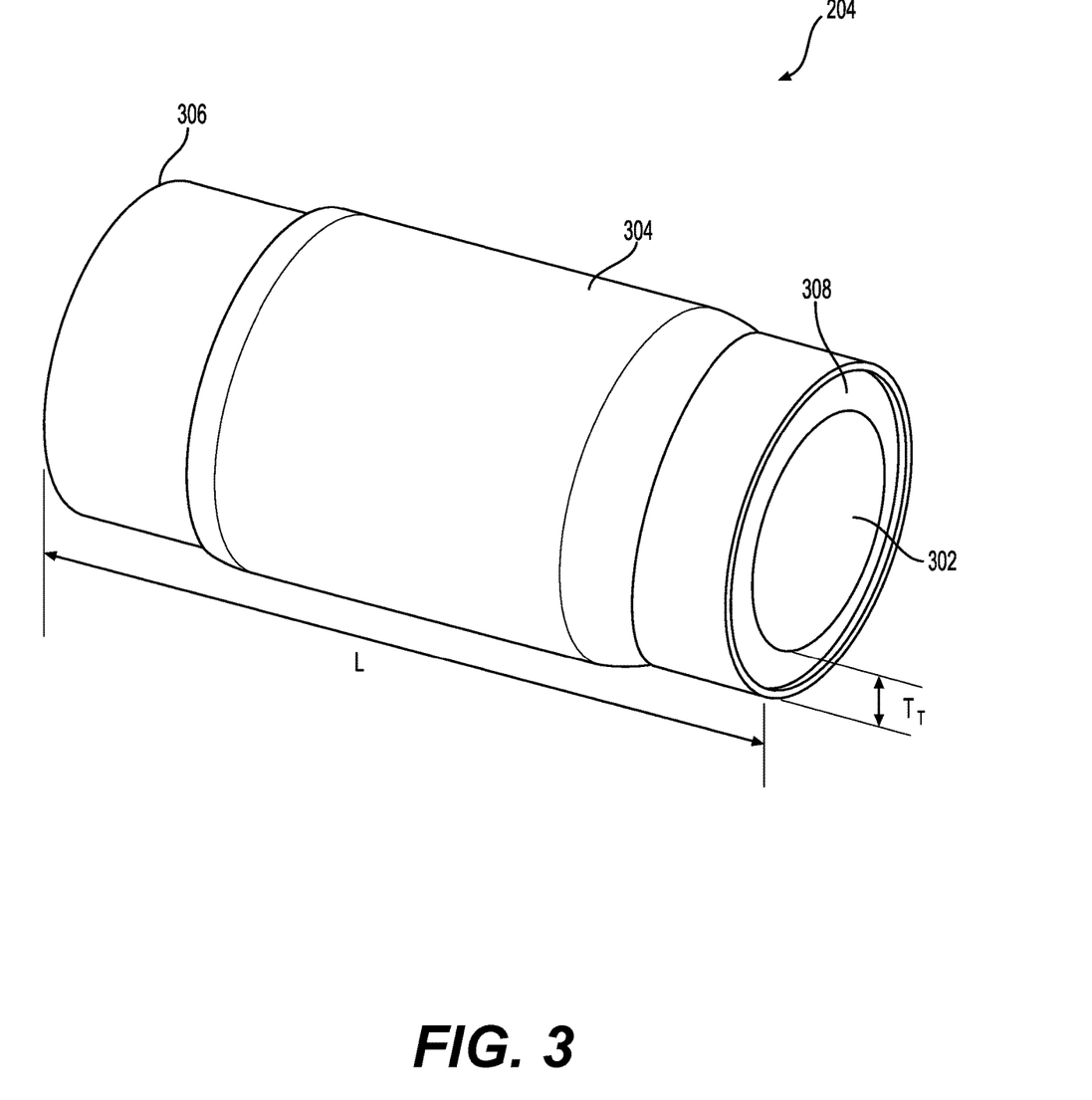
FIG. 3 is a schematic illustration of an example bushing of the portion of the track chain depicted in FIG. 2, according to example embodiments of the disclosure.

FIG. 3 is a schematic illustration of an example bushing 204, according to example embodiments of the disclosure. The track bushing 204 may have a generally hollow cylindrical shape including an inner surface 302 and an outer surface 304 defining a thickness "$T_T$" of the track bushing 204 therebetween. As shown, the inner surface 302 and the outer surface 304 may have a curvature to define the round shape of the track bushing 204. The track bushing 204 also has a first end ring 306 and a second end ring 308 defining a length "L" of the track bushing 204.

The shape and dimensions of the track bushing 204 may vary based on the application. For example, larger track chain assemblies 160 may include track bushings 204 of larger size than for smaller sized track chain assemblies 160. The thickness of various portions (e.g., hardened surface layers, softer core portions, etc.) of the track bushing 204 may also vary according to the application of the track bushing 204.

The track bushing 204, according to example embodiments of the disclosure, may be made of high carbon steel with additional processing as disclosed herein. High carbon steel, as used herein, includes alloy steel with high carbon content. The carbon content of the track bushing 204, as formed and prior to any hardening and/or tempering treatments, may be greater than approximately 0.8% carbon by weight. In other example embodiments, the track bushing 204, as formed and prior to any hardening and/or tempering treatments, may be greater than approximately 0.9% carbon by weight. For example, the track bushing may be formed from 52100 steel with a carbon content of greater than 0.9% by weight, such as between approximately 0.95% and 1.1% carbon by weight. In some example embodiments, the carbon content of the track bushing 204, as formed and prior to any hardening and/or tempering treatments, may be greater than approximately 1.1% carbon by weight, and in some cases, as high as 2% carbon by weight. Other elements present in the steel may include, but is not limited to, cobalt (Co), molybdenum (Mo), nickel (Ni), titanium (Ti), tungsten (W), niobium (Nb), vanadium (V), combinations thereof, or the like.

In alternative embodiments, the track bushing 204 may be made of high carbon steel, such as high carbon alloy steel, with additional processing as disclosed herein. In these embodiments, the carbon content of the track bushing 204 may lie approximately between 0.4 and 0.8% carbon by weight. In some cases, the track bushing 204, as formed and prior to any hardening and/or tempering treatments, may be between approximately 0.6% and 0.8% carbon by weight.

The track bushing 204 steel may further include other elements therein, such as manganese (Mn), phosphorus (P), sulfur (S), silicon (Si), chromium, and/or other materials. For example, the steel, prior to any hardening and/or tempering treatments, may include between approximately 0.1% and 0.6% Mn by weight, between approximately 0% and 0.1% P by weight, between approximately 0% and 0.1% S by weight, between approximately 0.1% and 0.5% Si by weight, and/or between approximately 0.6% and 3% Cr by weight.

The track bushing 204 steel, during rough bushing formation, may be spheroidized cementite crystal structure. The spheroidized cementite structure may be soft and ductile, allowing for easier formation of the track bushing 204. In example embodiments, if the starting high-carbon steel is not in a spheroidized cementite structure, then a spheroidizing process may be performed. In example embodiments, the spheroidizing process may be conducted at an under the carbon-steel eutectic temperature for a multi-hour anneal. For example, the steel may be held at 700° C. for 30 hours to spheroidize the steel prior to rough forming the track bushing 204. The temperature and/or time ranges here, and throughout the disclosure, are examples, and temperatures and time periods shorter or longer may be used in accordance with example embodiments of the disclosure.

According to example embodiments of the disclosure, the track bushing 204 after formation, may be subject to various thermal treatments, such as a direct hardening process, followed by an induction hardening process on the inner surface 302 or inner diameter (ID) of the track bushing 204. This direct hardening process followed by the induction hardening process may lead to formation of hardened steel at a region near both the outer surface 304 and the inner surface 302 of the track bushing 204, while a core portion may be softer and more ductile, leading to improved wear resistance and toughness. Thus, the outer portions, such as a certain depth into the bushing 204 near the inner surface 302 and a certain depth into the bushing near the outer surface 304, as described herein, of the track bushing 204 may have a mostly martensitic and/or austenitic structure, while the inner portions of the track bushing 204, farther away from the inner surface 302 and the outer surface 304 may have a mostly ferritic and/or cementitic crystal structure.

Figure 4:
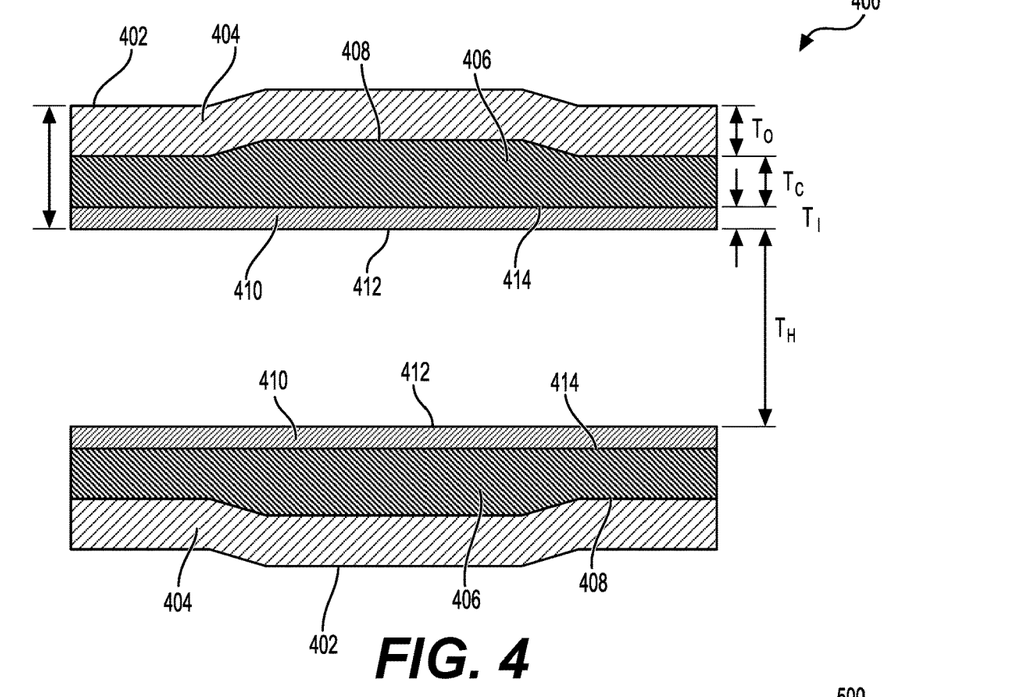
FIG. 4 is sectional illustration of an example bushing, according to example embodiments of the disclosure.

FIG. 4 is sectional illustration of an example bushing 400, according to example embodiments of the disclosure. This example bushing 400 cross section may be an illustrative sectioning through the diameter of the track bushing 204, where the exposed face sections of the sectioning is shown, without showing the curved inner surface 302.

As illustrated, the bushing 400 may have a total thickness $T_T$ with a bore hole diameter $T_H$. The bore hole may be a channel having a substantially constant diameter extending substantially centrally through the bushing 400. The bushing may have an outer surface 402, similar to outer surface 304, and an inner surface 412, similar to inner surface 302 of bushing 204. The bushing 400 may have an outer portion 404, with a thickness $T_O$, from interface 408 to the outer surface 402, and an inner portion 410, with a thickness $T_I$, from interface 414 to the inner surface 412. Between the inner portion 410 and the outer portion 404 may be disposed a core portion 406, with a thickness $T_C$. The core portion 406 and the outer portion 404 may meet at the interface 408, and the core portion 406 and the inner portion 410 may meet at the interface 414. Although the interfaces 408, 414 are depicted as sharp interfaces for the purposes of illustration, it should be understood that the transition between the outer portion 404 and the core portion 406 and/or the transition between the inner portion 410 and the core portion may be gradual and/or graded. The thickness dimensions, as discussed herein are in a radial direction from the channel extending substantially centrally through the bushing 400.

In some example embodiments, $T_T$ may be in the range of about 7 mm to about 20 mm, $T_O$ may be in the range of about 2 mm to about 11 mm, $T_C$ may be in the range of about 1 mm to about 10 mm, $T_I$ may be in the range of about 1 mm to about 6 mm, and $T_H$ may be in the range of about 30 mm to about 80 mm. In other example embodiments, $T_T$ may be in the range of about 10 mm to about 15 mm, $T_O$ may be in the range of about 5 mm to about 9 mm, $T_C$ may be in the range of about 2 mm to about 5 mm, $T_I$ may be in the range of about 2 mm to about 4 mm, and $T_H$ may be in the range of about 40 mm to about 60 mm. An example of the dimensions of the total thickness of the bushing $T_T$, the bore hole diameter $T_H$, the outer portion thickness To, the inner portion thickness $T_I$, and core portion thickness $T_C$ is shown herein in FIG. 5.

In some example embodiments, the ratio of the outer portion thickness to total thickness ($T_O:T_T$) may be in the range of about 1:10 to about 2:3. The ratio of the inner portion thickness to total thickness ($T_I:T_T$) may be in the range of about 1:20 to about 1:2. The ratio of the core portion thickness to total thickness ($T_C:T_T$) may be in the range of about 1:20 to about 2:3.

According to example embodiments, the inner portion 410 and the outer portion 404 of the bushing 400 may be substantially martensitic and/or austenitic in crystal structure. The core portion 406, on the other hand, may be cementitic, ferritic and/or pearlitic in crystal structure. The core portion 406 may also include martensitic crystal structure. The inner portion 410 and the outer portion 404 of the bushing 400, as disclosed herein, may be harder than the core portion 406 of the bushing 400.

In some example embodiments, the inner portion 410 and the outer portion 404 may have hardness in the range of about 55 Rockwell Hardness Scale C (HRC) to about 64 HRC and the core portion 406 may have hardness in the range of about 39 HRC to about 52 HRC. In other example embodiments, the inner portion 410 and the outer portion 404 may have hardness in the range of about 58 HRC to about 62 HRC and the core portion 406 may have hardness in the range of about 40 HRC to about 45 HRC.

The bushing 400 may be manufactured by forming a rough bushing using spheroidized cementite steel, such as 52100 steel. Rough bushing, as used herein, refers to the formation of the bushing with the high carbon steel starting material, such as high carbon alloy steel, prior to any subsequent thermal treatments, hardening, tempering, or the like. High carbon steel, including high carbon alloy steel, that has cementite structure may be more easily machined than hardened carbon steel. The rough bushing may be subject to a hardening process, such as direct hardening. This direct hardening may be performed in any suitable furnace, such as an induction furnace or a gas furnace. In some cases, this direct hardening process may be a batch process, where more than one rough bushing and/or other components of the machine 100 may be hardened simultaneously. The rough bushing may be quenched, such as in oil. An optional tempering process may be performed, such as after the hardening process. The entirety of the rough bushing may have a hardened martensitic, austenitic, and/or bainite structure. In other words, the rough bushing, after the hardening process, may be substantially uniformly hardened.

An induction hardening process may be performed on the inner surface 412 (e.g., inner diameter (ID)) of the hardened bushing. The surface heating may be performed by inducing a current from an alternating magnetic and/or electric field proximal to the inner surface 412 of the bushing 400. The induction hardening process may harden the region near the inner surface 412 by the surface heating. The surface hardening may form the inner portion 410 of the bushing 400. At the same time, the induction heating may cause tempering of the core portion 406 of the bushing 400. Thus, the surface hardening may cause the inner portion 410 to reheat and be quenched to cause a hard martensitic and/or austenitic structure, while, at the same time, the core portion 406 may be tempered to transition from a hard martensitic and/or austenitic structure to a softer cementitic structure. In this way, a soft core portion 406 is achieved while a hard inner portion 410 and outer portion 404 is achieved.

Figure 5:
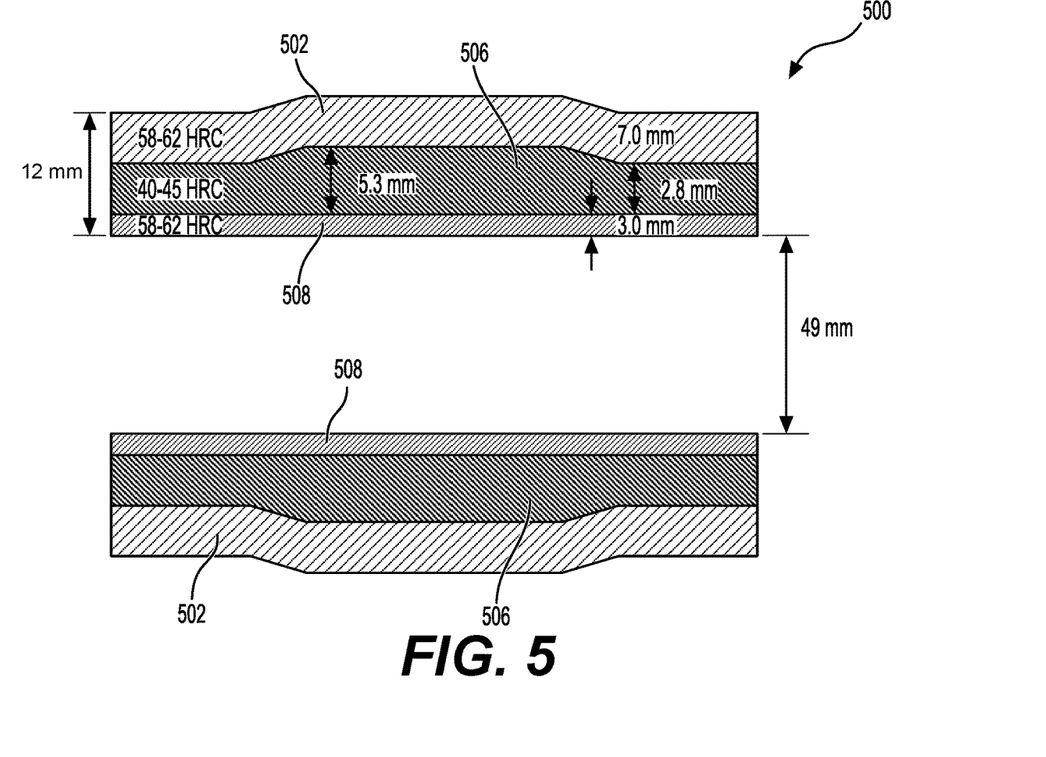
FIG. 5 is another sectional illustration of a particular bushing according to example embodiments of the disclosure.

FIG. 5 is another sectional illustration of a particular bushing 500 according to example embodiments of the disclosure. This bushing 500 cross section may be an illustrative sectioning through the diameter of the track bushing 204, where the exposed face sections of the sectioning is shown, without showing the curved inner surface 302. The dimensions and parameter ranges discussed herein are examples and are not meant to be limiting in any way.

The bushing 500 may have a total thickness of 12.8 mm with a bore hole diameter of 49 mm. The bushing 500 may have an outer portion 502, with a thickness of 7 mm, and an inner portion 508, with a thickness of 3 mm. Between the inner portion 508 and the outer portion 502 may be disposed a core portion 506, with a thickness 2.8 mm on an edge of the bushing 500 and 5.3 mm near the middle of the bushing 500. In example embodiments, the inner portion 508 and the outer portion 502 may have hardness in the range of about 58 HRC to about 62 HRC and the core portion 506 may have hardness in the range of about 40 HRC to about 45 HRC. The thicknesses of the various regions 502, 506, 508 of bushing 500, as well as their relative ratios, are in the ranges disclosed with reference to bushing 400 of FIG. 4.

Figure 6:
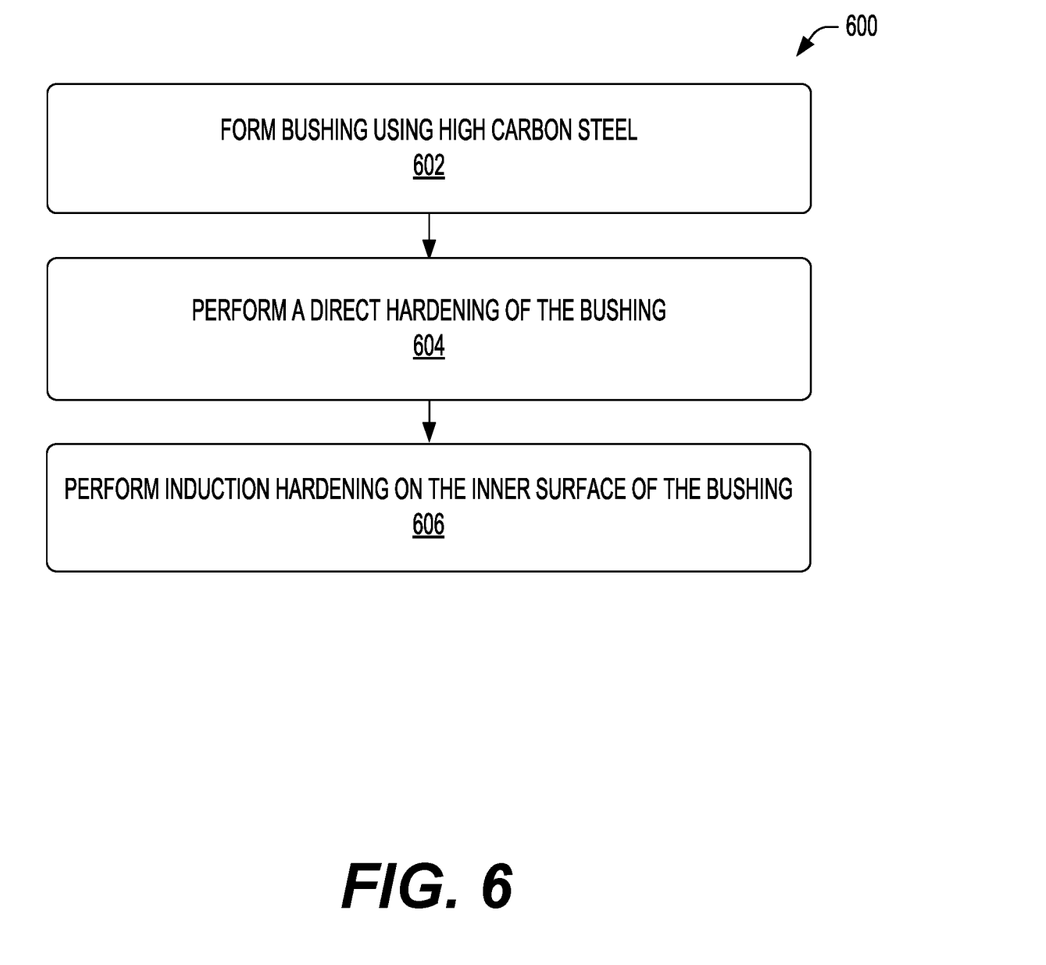
FIG. 6 is a flow diagram depicting an example method for forming the example bushing of FIG. 4, according to example embodiments of the disclosure.

FIG. 6 is a flow diagram depicting an example method 600 for forming the example bushing 400 of FIG. 4, according to example embodiments of the disclosure. The method 600 may be performed using high-carbon steel, as discussed herein, in a spheroidized cementite structure (e.g., spheroidized cementite and ferrite). In example embodiments, the starting steel may be 52100 steel, or other similar high-carbon steel. Alternatively, medium carbon steel may be used.

High carbon steel, as used herein, includes alloy steel with high carbon content. The carbon content of the high carbon steel may be greater than approximately 0.8% carbon by weight. In other example embodiments, the track bushing, as formed and prior to any hardening and/or tempering treatments, may include greater than approximately 0.9% carbon by weight. For example, the track bushing may be formed from 52100 steel with a carbon content of greater than 0.9% by weight, such as between approximately 0.95% and 1.1% carbon by weight. In some example embodiments, the carbon content of the track bushing 204, as formed and prior to any hardening and/or tempering treatments, may be greater than approximately 1.1% carbon by weight, and in some cases, as high as 2% carbon by weight. Other elements present in the steel may include, but is not limited to, cobalt (Co), molybdenum (Mo), nickel (Ni), titanium (Ti), tungsten (W), niobium (Nb), vanadium (V), combinations thereof, or the like.

As discussed herein, the high carbon steel, such as high carbon alloy steel, from which the rough bushings are formed may be in a spheroidized cementite crystal structure. The spheroidized cementite structure may be soft and ductile, allowing for easier formation of the track bushing 204. In example embodiments, if the starting high-carbon steel is not in a spheroidized cementite structure, then optionally, a spheroidizing process may be performed prior to commencing the method 600. In example embodiments, the spheroidizing process may be conducted at an under the carbon-steel eutectic temperature (e.g., 725° C.) for a multi-hour anneal. For example, the steel may be held at a temperature range between 650° C. and 720° C. for 20 to 40 hours to spheroidize the steel prior to rough forming the track bushing 204.

At block 602, a bushing may be formed from high-carbon steel. As discussed above the steel may be in a spheroidized cementite structure when forming the bushing. For example, the steel may include mostly spheroidized cementite, ferrite, and/or pearlite. If the steel had previously been hardened, then the steel may also include martensite and/or austenite crystal structure. This form of the high-carbon steel is relatively soft and ductile and is, therefore, amenable to machining. Formation of the bushing, in this case a rough bushing, may include any variety of machining techniques suitable for forming the bushing. For example, any type of shaping, turning, milling, drilling, grinding, and/or other machining techniques may be used to form the rough bushing.

At block 604, a direct hardening of the bushing may be performed. The direct hardening processing may be performed by heating the bushing to a higher than eutectic temperature. This direct hardening may be performed in any suitable furnace, such as an induction furnace or a gas furnace. In some cases, this direct hardening process may be a batch process, where more than one rough bushing and/or other components of the machine 100 may be hardened simultaneously.

The furnace process may be performed at any suitable temperature and time. For example, the furnace process may be performed at greater than 800° C. for predetermined time. In some example embodiments, the furnace process may be performed in a temperature range from about 800° C. to about 950° C. for a time range of about 30 minutes to about 3 hours. For example, the furnace heating process of the direct hardening may be performed at 850° C. for 60 minutes. After performing the furnace process, the rough bushing may be quenched, such as in oil. Alternatively, the quenching process may be in any suitable medium, such as a salt bath, air, and/or water. An optional tempering process may be performed after the hardening process.

After the direct hardening process, the entirety of the rough bushing may have a hardened martensitic, austenitic, and/or bainite structure. In other words, the rough bushing, at this point, may be substantially uniformly hardened throughout its thickness $T_T$. As a result of the direct hardening process, the hardness of the entire bushing may be in the range of about 55 HRC to about 62 HRC. For example, the bushing may be approximately 60 HRC after the direct hardening process.

Hardened martensitic carbon steel, while providing high wear resistance and reduced level of galling, is generally brittle and lack ductility. Thus, the uniform hardening in the bushing at this stage of processing may result in less than desired toughness of the bushing.

At block 606, induction hardening on the inner surface of the bushing may be performed. The induction hardening in the inner surface 412 may be performed by providing magnetic and/or electrical alternating fields in proximity of the inner surface 412 to induce electrical current, according to Faraday's Law, near the inner surface 412. The magnetic and/or electrical alternating fields may be generated in proximity of the inner surface 412 by inserting a coil electrically powered at a desired alternating frequency and power level within the channel extending substantially centrally defined by the inner surface 412 and in proximity to the inner surface 412. In some cases, the coils used to perform the induction hardening may be shaped such that the entirety of the length L of the bushing may be heated at the same time. Alternatively, the coil may be moved along the length L of the bushing (e.g., rastered) to allow all of the inner surface 412 to be heated by induction current.

The heating by this induction heating process may be localized near the inner surface 412 where the induction current is generated. Thus, there may be a temperature gradient extending into the bushing when using induction heating. In this case, the inner surface 412 may be at the highest temperature with decreasing temperatures extending in a radial direction into the bushing away from the inner surface 412. As a result, the region closest to the inner surface 412 may be heated to an above carbon-steel $A_{c1}$ temperature, while regions farther away from the inner surface 412 may be heated to a below carbon-steel $A_{c1}$ temperature. The $A_{c1}$ temperature may be the temperature where austenite begins to form when heating carbon steel. In this way, the regions close to the inner surface 412 may be hardened, while regions farther away from the inner surface 412 may be tempered during the induction hardening process.

According to example embodiments, the power and frequency for induction hardening may be selected to control the depth $T_I$ of the inner portion 404 of the bushing 400. In the depth $T_I$ of the inner portion 404, the temperature during induction hardening may be raised to between about 800° C. and about 1000° C. In some example embodiments, the temperature may be raised to between about 850° C. and about 950° C. within the depth $T_I$ of the inner portion 404. For example, the induction heating may be performed such that the temperature near the inner surface 412 is approximately 900° C.

As discussed above, when the temperature within the depth $T_I$ of the inner portion 404 is in the range of about 800° C. to about 1000° C., the temperature in the core portion 406 is lower than the temperature at the inner portion 404. In example embodiments, the temperature within the core portion 406 may be in the range of about 500° C. to about 800° C. during the induction hardening process. In some example embodiments, the temperature within the core portion 406 during induction hardening may be in the range of about 650° C. to about 750° C. As a result, the core portion 406 may be tempered simultaneously, when the inner portion 404 is hardened.

In example embodiments, the time range for induction hardening may be in the range of about 3 seconds to about 3 hours. For example, the induction heating process may be performed at 925° C. for 30 seconds. After performing the induction heating process, the bushing may be quenched in air. Alternatively, the quenching process may be in any suitable medium, such as a salt bath, oil, and/or water.

After the induction heating process, the bushing 400 may be hardened in the inner portion 404 and softened in the core portion 406. The outer portion 404 may be substantially unchanged from when that portion was hardened as part of the direct hardening process of block 604. Thus, after the induction hardening process, the inner portion 410 and the outer portion 404 may have hardness in the range of about 55 HRC to about 64 HRC and the core portion 406 may have hardness in the range of about 39 HRC to about 52 HRC. In other example embodiments, the inner portion 410 and the outer portion 404 may have hardness in the range of about 58 HRC to about 62 HRC and the core portion 406 may have hardness in the range of about 40 HRC to about 45 HRC.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
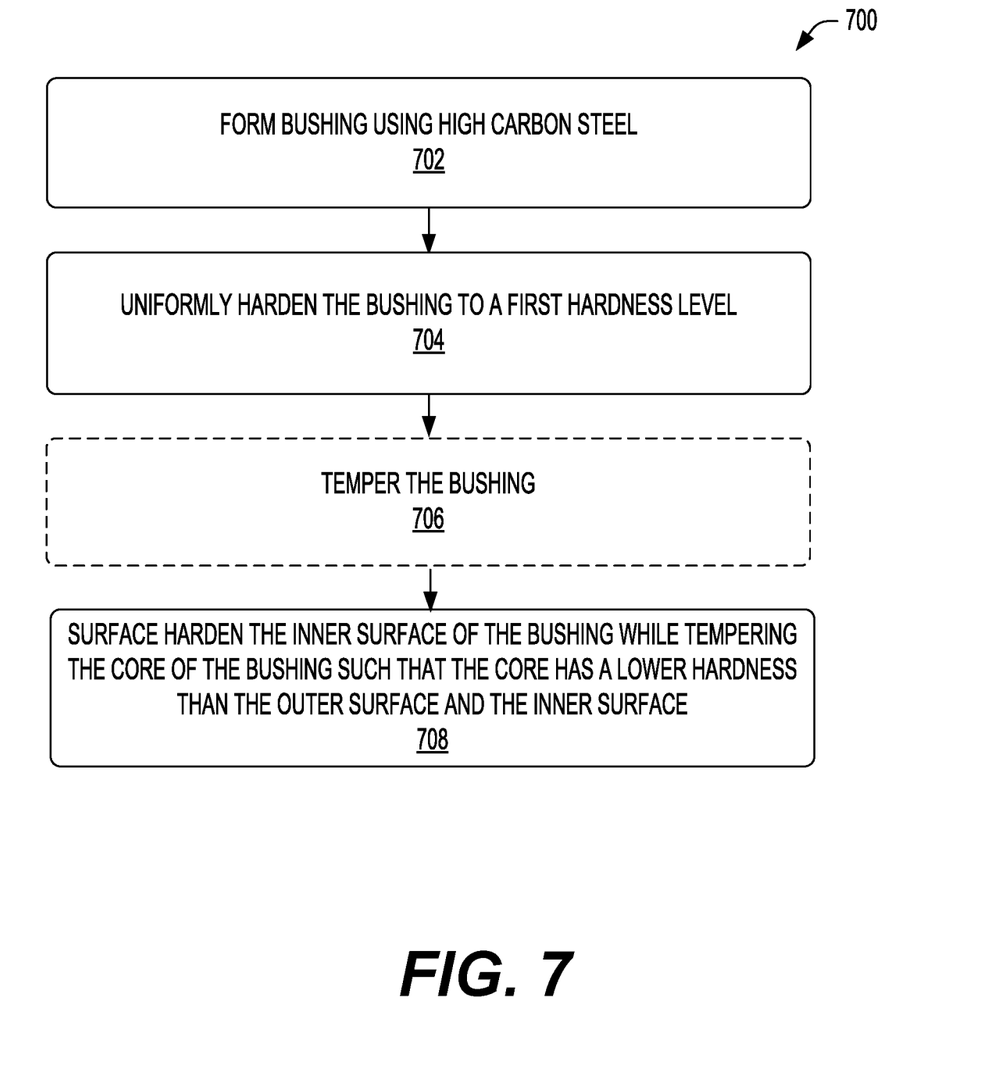
FIG. 7 is a flow diagram depicting another example method for forming the example bushing of FIG. 4, according to example embodiments of the disclosure.

FIG. 7 is a flow diagram depicting another example method 700 for forming the example bushing of FIG. 4, according to example embodiments of the disclosure. The method 700 may be performed using high-carbon steel, as discussed herein, in a speroidized cementite structure. In example embodiments, the starting steel may be 52100 steel, or other similar high-carbon steel. Alternatively, medium carbon steel may be used.

As discussed herein, prior to any processing, the high carbon steel, such as high carbon alloy steel, may be in a spheroidized cementite crystal structure, along with ferrite crystal structure. The spherodoidized cementite structure may be soft and ductile, allowing for easier formation of the track bushing 204. In example embodiments, if the starting high-carbon steel is not in a spheroidized cementite structure, then optionally, a spheroidizing process may be performed prior to commencing the method 700. In example embodiments, the spheroidizing process may be conducted at an under the carbon-steel eutectic temperature (e.g., 725° C.) for a multi-hour anneal. For example, the steel may be held at a temperature range between 650° C. and 720° C. for 20 to 40 hours to spheroidize the steel prior to rough forming the track bushing 204.

At block 702, a bushing may be formed from high-carbon steel. As discussed above the steel may be in a spheroidized cementite structure when forming the bushing. This form of the high-carbon steel is relatively soft and ductile and is, therefore, amenable to machining. Formation of the bushing, in this case a rough bushing, may include any variety of machining techniques suitable for forming the bushing. For example, any type of shaping, turning, milling, drilling, grinding, and/or other machining techniques may be used to form the rough bushing.

At block 704, the bushing may be hardened uniformly to a first hardness level. As discussed herein, this may be achieved by a direct hardening process or other similar processes. The direct hardening processing may be performed by heating the bushing to a higher than $A_{c1}$ temperature. This direct hardening may be performed in any suitable furnace, such as an induction furnace or a gas furnace. In some cases, this direct hardening process may be a batch process, where more than one rough bushing and/or other components of the machine 100 may be hardened simultaneously.

The furnace process may be performed at any suitable temperature and time. For example, the furnace process may be performed at greater than 800° C. for predetermined time. In some example embodiments, the furnace process may be performed in a temperature range from about 800° C. to about 950° C. for a time range of about 30 minutes to about 3 hours. For example, the furnace heating process of the direct hardening may be performed at 850° C. for 60 minutes. After performing the furnace process, the rough bushing may be quenched, such as in oil. Alternatively, the quenching process may be in any suitable medium, such as a salt bath, air, and/or water. An optional tempering process may be performed after the hardening process.

After the direct hardening process, the entirety of the rough bushing may have a hardened martensitic, austenitic, and/or bainite structure. In other words, the rough bushing, at this point, may be substantially uniformly hardened throughout its thickness $T_T$. As a result of the direct hardening process, the hardness of the entire bushing may be in the range of about 55 HRC to about 62 HRC. For example, the bushing may be approximately 60 HRC after the direct hardening process.

Hardened martensitic carbon steel, while providing high wear resistance and reduced level of galling, is generally brittle and lack ductility. Thus, the uniform hardening in the bushing at this stage of processing may result in less than desired toughness of the bushing.

At block 706, the bushing may optionally be tempered. This tempering process, among other things, may be to relieve the stresses and reduce micro-cracking that may have resulted from an oil quenching process. In example embodiments, the tempering process may be at a temperature in the range of about 100° C. to about 200° C. for about 30 minutes to about 3 hours. In one example, the tempering process may be at 150° C. for 60 minutes. In some cases, this tempering process may be performed in batch, such as with other components of machine 100, such as other bushings 204. The tempering process may be performed in any suitable furnace or heating chamber, such as an induction furnace and/or gas furnace.

At block 708, the inner surface of the bushing may be surface hardened while tempering the core of the bushing such that the core has a lower hardness than the outer surface and the inner surface. As discussed herein, this may be performed using an induction hardening process. As discussed herein, the induction hardening in the inner surface 412 may be performed by providing magnetic and/or electrical alternating fields in proximity of the inner surface 412 to induce electrical current, according to Faraday's Law, near the inner surface 412. The magnetic and/or electrical alternating fields may be generated in proximity of the inner surface 412 by inserting a coil electrically powered at a desired alternating frequency and power level within the hole of the bearing defined by the inner surface 412 and in proximity to the inner surface 412. In some cases, the coils used to perform the induction hardening may be shaped such that the entirety of the length L of the bushing may be heated at the same time. Alternatively, the coil may be moved along the length L of the bushing (e.g., rastered) to allow all of the inner surface 412 to be heated by induction current.

The heating by this induction heating process may be localized near the inner surface 412 where the induction current is generated. Thus, there may be a temperature gradient extending into the bushing when using induction heating. In this case, the inner surface 412 may be at the highest temperature with decreasing temperatures extending in a radial direction into the bushing away from the inner surface 412. As a result, the region closest to the inner surface 412 may be heated to an above carbon-steel eutectic temperature, while regions farther away from the inner surface 412 may be heated to a below carbon-steel eutectic temperature. In this way, the regions close to the inner surface 412 may be hardened, while regions farther away from the inner surface 412 may be tempered during the induction hardening process.

According to example embodiments, the power and frequency for induction hardening may be selected to control the depth $T_I$ of the inner portion 404 of the bushing 400. In the depth $T_I$ of the inner portion 404, the temperature during induction hardening may be raised to between about 800° C. and about 1000° C. In some example embodiments, the temperature may be raised to between about 850° C. and about 950° C. within the depth $T_I$ of the inner portion 404. For example, the induction heating may be performed such that the temperature near the inner surface 412 is approximately 900° C.

As discussed above, when the temperature within the depth $T_I$ of the inner portion 404 is in the range of about 800° C. to about 1000° C., the temperature in the core portion 406 is lower than the temperature at the inner portion 404. In example embodiments, the temperature within the core portion 406 may be in the range of about 500° C. to about 800° C. during the induction hardening process. In some example embodiments, the temperature within the core portion 406 during induction hardening may be in the range of about 650° C. to about 750° C. As a result, the core portion 406 may be tempered simultaneously, when the inner portion 404 is hardened.

In example embodiments, the time range for induction hardening may be in the range of about 3 seconds to about 3 hours. For example, the induction heating process may be performed at 925° C. for 15 seconds. After performing the induction heating process, the bushing may be quenched in air. Alternatively, the quenching process may be in any suitable medium, such as a salt bath, oil, and/or water.

After the induction heating process, the bushing 400 may be hardened in the inner portion 404 and softened in the core portion 406. The outer portion 404 may be substantially unchanged from when that portion was hardened as part of the direct hardening process of block 704. Thus, after the induction hardening process, the inner portion 410 and the outer portion 404 may have hardness in the range of about 55 HRC to about 64 HRC and the core portion 406 may have hardness in the range of about 39 HRC to about 52 HRC. In other example embodiments, the inner portion 410 and the outer portion 404 may have hardness in the range of about 58 HRC to about 62 HRC and the core portion 406 may have hardness in the range of about 40 HRC to about 45 HRC.

It should be noted that some of the operations of method 700 may be performed out of the order presented, with additional elements, and/or without some elements. Some of the operations of method 700 may further take place substantially concurrently and, therefore, may conclude in an order different from the order of operations shown above.

INDUSTRIAL APPLICABILITY

The present disclosure describes systems, structures, and methods to improve wear tolerance and toughness of components, such as components for track-type machines 100. These improved components may include bushings 204 used in track chain assemblies 160 of machines 100. The bushings 204, as disclosed herein, may have a hard, wear-resistant outer and inner portion, as well as a soft core portion. The soft core portion provides for a high level of toughness of the bushing 204, while the hard outer and inner portions provide for a high level of wear resistance and reduced galling during operation. Although the bushings 204 and the procedures to from the bushings 204 are discussed in the context of track-type machines and undercarriages of those track-type machines, it should be appreciated that the bushings 204 and the mechanisms to form the same are applicable across a wide array of mechanical systems, such as any mechanical system that can benefit from improved wear resistance of bushings and/or other parts.

As a result of the systems, apparatus, and methods described herein, consumable parts of machines, such as bushings may have a greater lifetime. For example, the track bushings 204 described herein may have greater service lifetime than traditional bushings 204 that are not formed by the mechanisms described herein. In some cases, the bushings 204 and/or other components may allow for a 25% to 400% improvement in the wear lifetime of consumable parts of track-type machines 100. This reduces field downtime, reduces the frequency of servicing and maintenance, and overall reduces the cost of heavy equipment, such as track-type machines 100. The improved reliability and reduced field-level downtime also improves the user experience such that the machine 100 can be devoted to its intended purpose for longer times and for an overall greater percentage of its lifetime. Improved machine 100 uptime and reduced scheduled maintenance may allow for more efficient deployment of resources (e.g., fewer, but more reliable machines 100 at a construction site). Thus, the technologies disclosed herein improve the efficiency of project resources (e.g., construction resources, mining resources, etc.), provide greater uptime of project resources, and improves the financial performance of project resources.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A track chain assembly, comprising:
a bushing, the bushing including:
an outer surface and an inner surface opposing the outer surface, the inner surface defining a channel having a constant diameter, the channel extending centrally through the bushing from a first end of the bushing to a second end of the bushing opposite the first end;
an inner portion including the inner surface, the inner portion having a uniform thickness and extending along an entirety of the inner surface;
an outer portion including the outer surface, the outer portion having a uniform thickness and extending along an entirety of the outer surface; and
a core portion disposed between the inner portion and the outer portion, wherein:
the core portion comprises a middle portion having a first thickness and an edge portion having a second thickness less than the first thickness,
the core portion has an HRC value that is lower than an HRC value for the inner portion and an HRC value for the outer portion, and
each of the core portion, the inner portion, and the outer portion comprises steel having a carbon content greater than 0.8% by weight.

2. The track chain assembly of claim 1, wherein:
the inner portion has a hardness of at least 55 HRC;
the outer portion has a hardness of at least 55 HRC; and
the core portion has a hardness of less than 52 HRC.

3. The track chain assembly of claim 1, wherein the inner portion and the outer portion have a mostly martensitic crystal structure.

4. The track chain assembly of claim 1, wherein the steel comprises a carbon content greater than 1% by weight.

5. The track chain assembly of claim 1, wherein the inner portion has a thickness of at least 2 mm.

6. The track chain assembly of claim 1, wherein the outer portion has a thickness of at least 5 mm.

7. The track chain assembly of claim 1, wherein the core portion includes cementite crystal structure.

8. The track chain assembly of claim 1, wherein a thickness of the inner portion is at least 2 mm and a ratio of the thickness of the inner portion to a thickness of the bushing is in a range of 1:20 to 1:2.

9. The track chain assembly of claim 1, wherein:
the inner portion has a hardness of at least 60 HRC;
the outer portion has a hardness of at least 60 HRC; and
the core portion has a hardness of less than 45 HRC.

10. The track chain assembly of claim 1, wherein the steel comprises a carbon content greater than 0.9% by weight.

11. The track chain assembly of claim 1, wherein the core portion has a thickness in a range of 2.8 mm to 5.3 mm.

12. A bushing, comprising:
an outer surface and an inner surface opposing the outer surface, the inner surface defining a channel having a constant diameter, the channel extending centrally through the bushing from a first end of the bushing to a second end of the bushing opposite the first end;
an inner portion including the inner surface, the inner portion having a uniform thickness and extending along an entirety of the inner surface;
an outer portion including the outer surface, the outer portion having a uniform thickness and extending along an entirety of the outer surface; and
a core portion disposed between the inner portion and the outer portion, wherein:
the core portion comprises a middle portion having a first thickness and an edge portion having a second thickness less than the first thickness; and
the core portion has a hardness that is lower than a hardness of the inner portion and the core portion has a hardness that is lower than a hardness of the outer portion and each of the core portion, the inner portion, and the outer portion comprises steel having a carbon content greater than 0.8% by weight.

13. The bushing of claim 12, wherein:
the inner portion has a hardness of at least 55 HRC;
the outer portion has a hardness of at least 55 HRC; and
the core portion has a hardness of less than 52 HRC.

14. The bushing of claim 12, wherein the inner portion and the outer portion have a mostly martensitic crystal structure.

15. The bushing of claim 12, wherein the steel comprises carbon content greater than 1% by weight.

16. The bushing of claim 12, wherein the inner portion has a thickness of at least 2 mm.

17. The bushing of claim 12, wherein the outer portion has a thickness of at least 5 mm.

18. The bushing of claim 12, wherein:
the inner portion has a hardness of at least 60 HRC;
the outer portion has a hardness of at least 60 HRC; and
the core portion has a hardness of less than 45 HRC.

19. The bushing of claim 12, wherein the steel comprises a carbon content greater than 0.9% by weight.

20. The bushing of claim 12, wherein the core portion has a thickness in a range of 2.8 mm to 5.3 mm.

* * * * *